(No Model.) 5 Sheets—Sheet 3.
E. G. WATROUS.
CASH REGISTER AND INDICATOR.
No. 544,243. Patented Aug. 6, 1895.
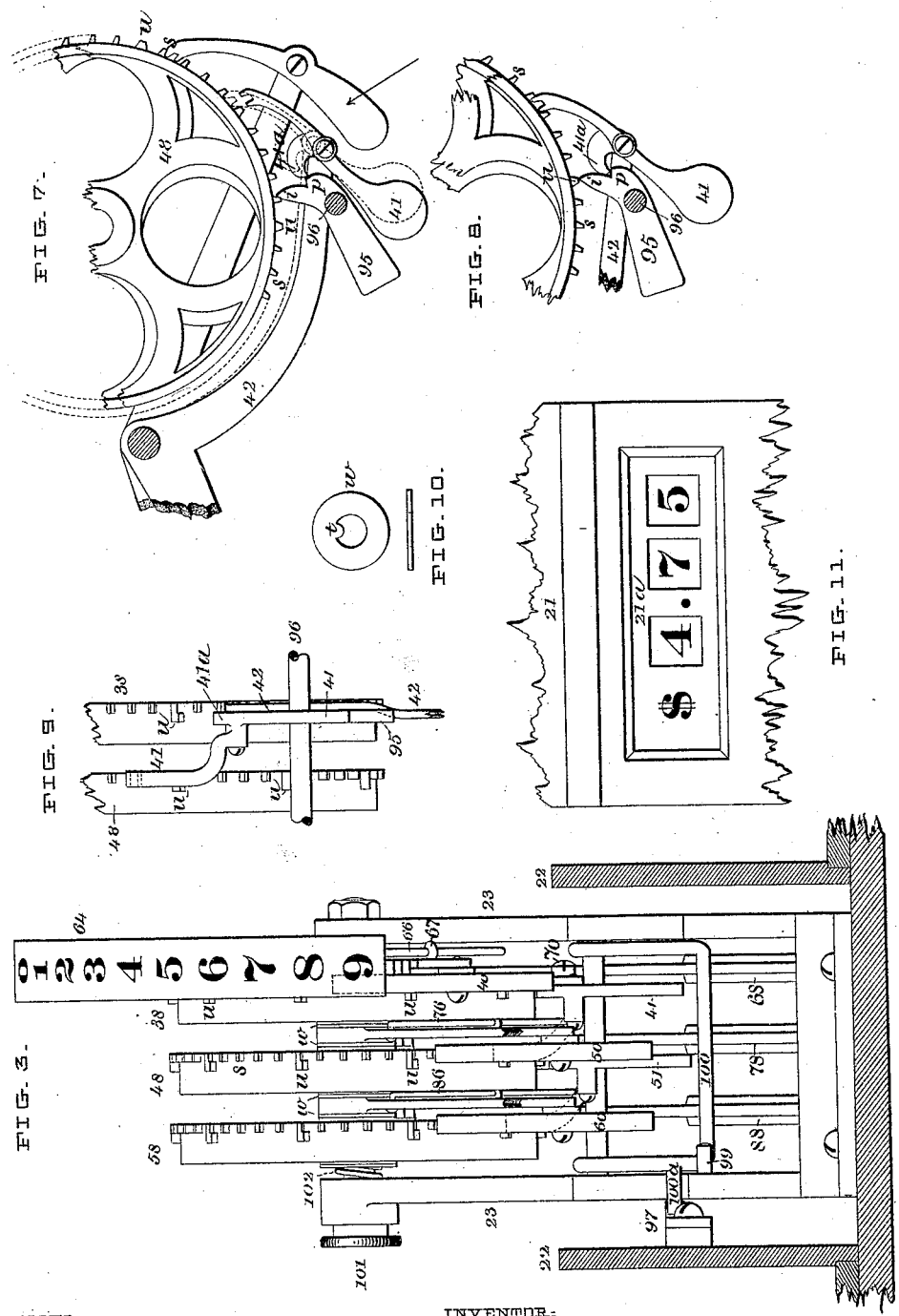
WITNESSES:
Charles H. Houghton
S. James McKee
INVENTOR:
EARL G. WATROUS,
by Franklin Scott, Attorney.

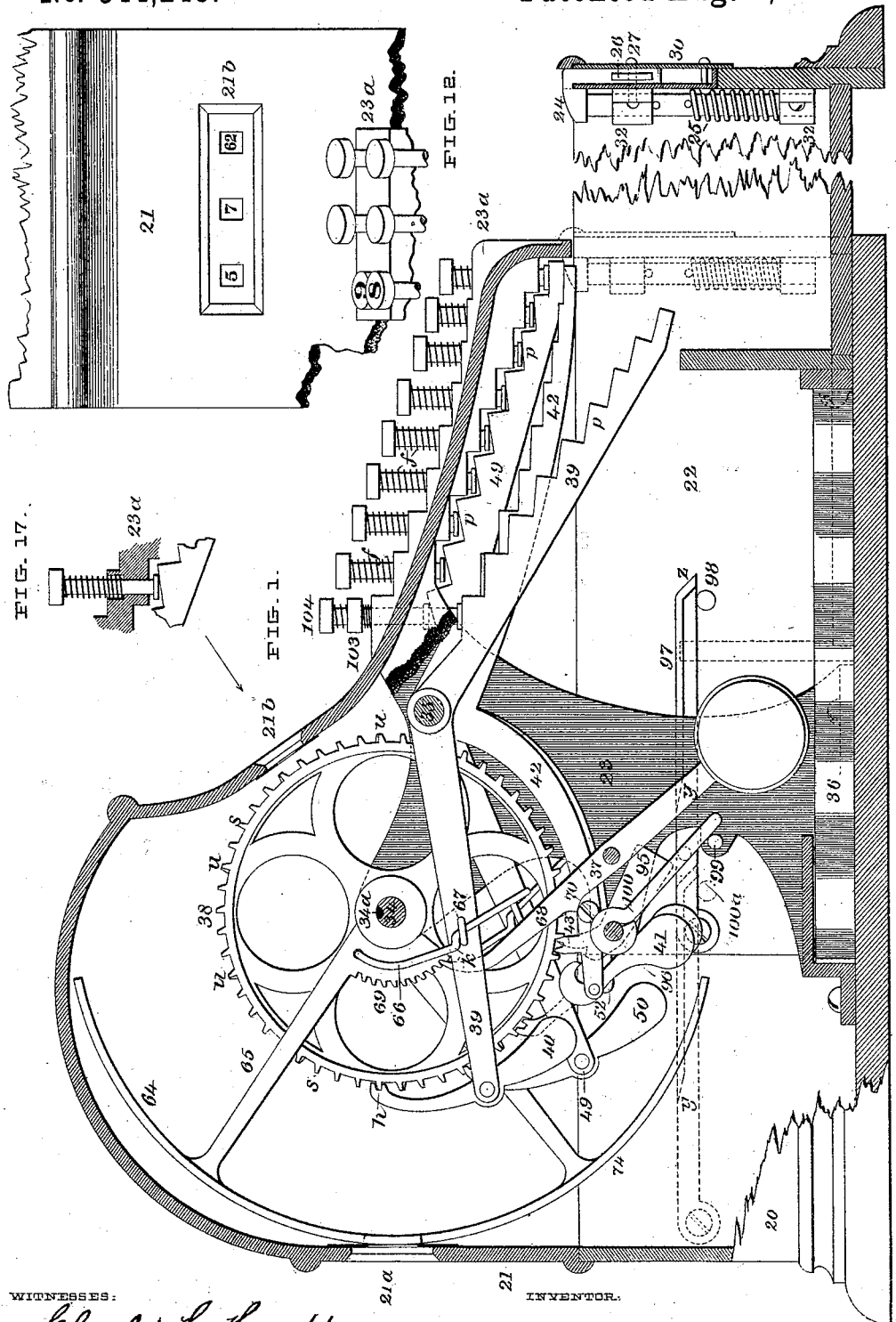

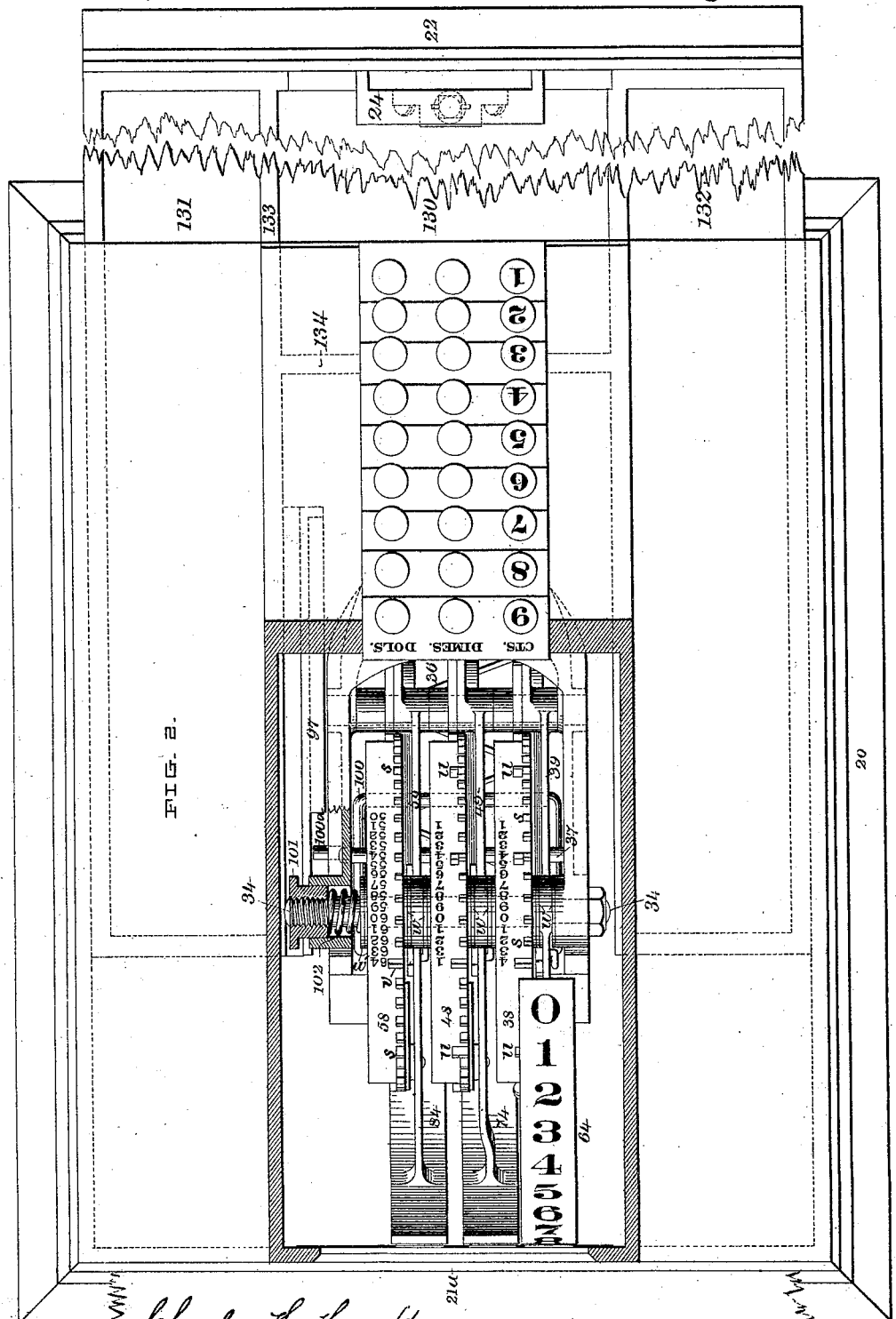

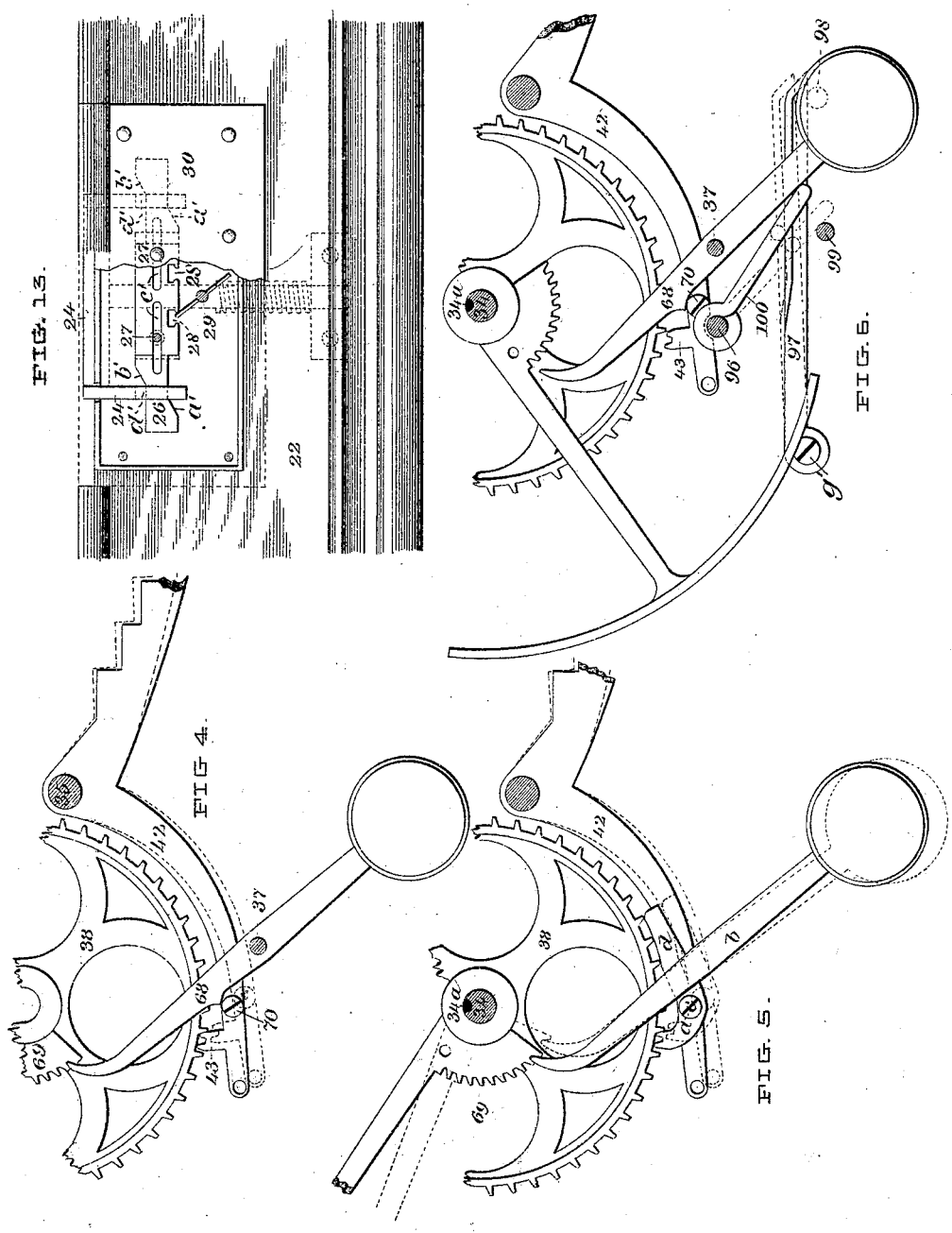

(No Model.) 5 Sheets—Sheet 5.
E. G. WATROUS.
CASH REGISTER AND INDICATOR.
No. 544,243. Patented Aug. 6, 1895.
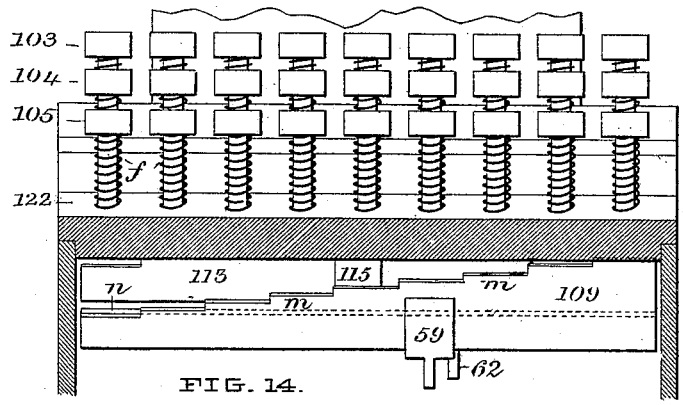
FIG. 14.
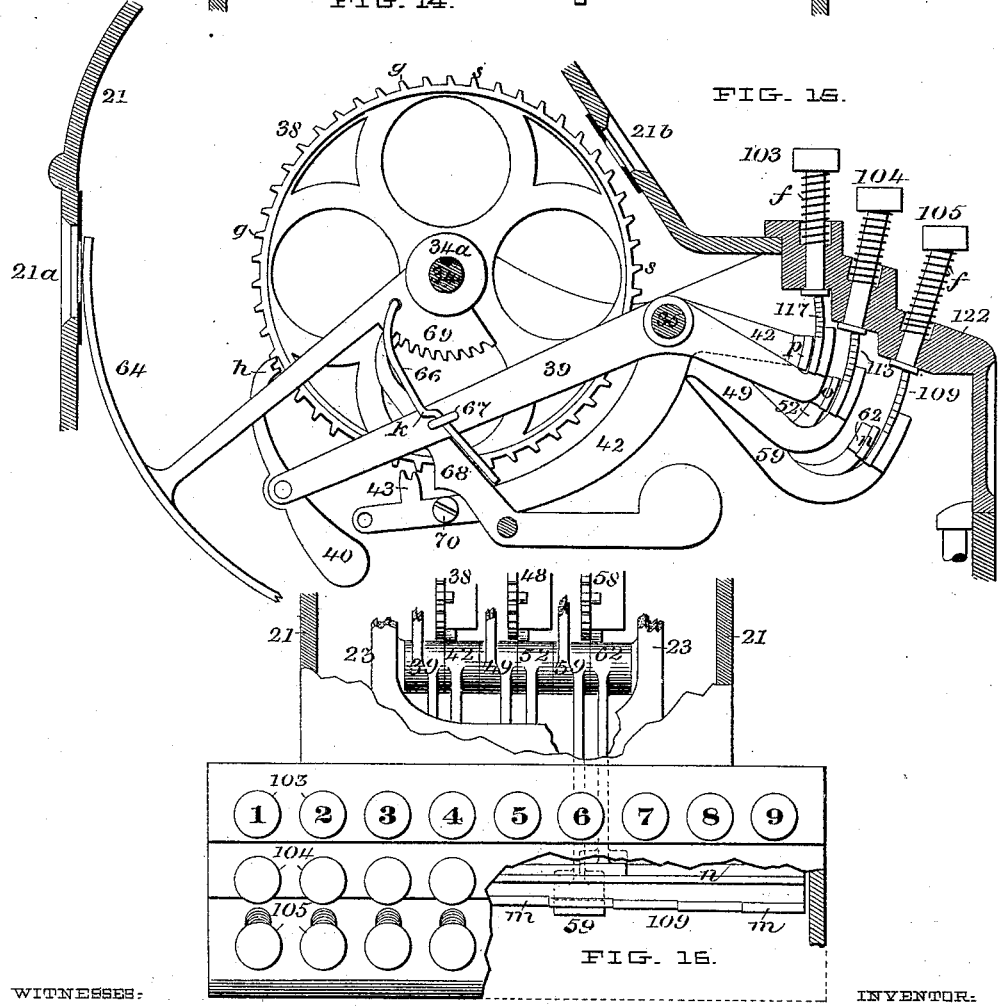
FIG. 15.
FIG. 16.
WITNESSES:
Charles H. Houghton
J. James McKie
INVENTOR:
EARL G. WATROUS,
by Franklin Scott, Attorney.

UNITED STATES PATENT OFFICE.

EARL G. WATROUS, OF HOOSICK FALLS, ASSIGNOR TO THE CAPITAL CASH REGISTER COMPANY, OF TROY, NEW YORK.

CASH REGISTER AND INDICATOR.

SPECIFICATION forming part of Letters Patent No. 544,243, dated August 6, 1895.

Application filed July 21, 1892. Serial No. 440,763. (No model.)

*To all whom it may concern:*

Be it known that I, EARL G. WATROUS, of the village of Hoosick Falls, in the county of Rensselaer and State of New York, have invented a new and useful Improvement in Cash-Registers; and I hereby declare that the subjoined description, in connection with the accompanying drawings, constitute a full and complete specification thereof.

This invention relates to that class of machines used for the purpose of receiving and holding cash, and of making a registration of the successive deposits placed therein.

As heretofore made, machines of this kind have been usually complex in construction, necessitating the employment of a large number of intricate parts, which difficulty my invention is designed to obviate. It is fully shown in the drawings, of which—

Figure 1 is a vertical section through the inclosing-case, showing the working parts with one key depressed. Fig. 2 is a plan view of the same with the top of the inclosing-case cut away to show the parts beneath. Fig. 3 is an elevation of that side of the apparatus opposite to the operator, showing the same position of parts as in Figs. 1 and 2. Fig. 4 is a side elevation in detail of the checking mechanism. Fig. 5 is a similar view of a modified checking device. Fig. 6 is a side elevation in detail of the parts which act to release the indicators and bring them to rest preparatory to indicating a new deposit. Fig. 7 is an elevation of the means provided for transferring registration from one wheel to another. Fig. 8 shows the same parts in a different position. Fig. 9 is an end view of the transfer mechanism, as seen in the direction of the arrow in Fig. 7. Fig. 10 is a detail of one of the antifriction-washers employed on the spindle to prevent the action of one target from communicating by contact motion to its fellow, by separating the hubs of the targets from the hubs of the registry-wheels. Figs. 11 shows the opening through which the amount of each deposit, as indicated by the targets, is read. Fig. 12 shows the openings through which the total amount of all deposits, as indicated by the registry-wheels, may be read. Fig. 13 is a face view of the drawer-locking device. Fig. 14 is an end elevation of a modified arrangement of keyboard and levers, of which Fig. 15 is a sectional elevation and Fig. 16 is a plan, with a portion of the keyboard broken away to show the levers beneath. Fig. 17 is a section through one of the sockets of an operating-key.

In general design the machine is composed of a rectangular base or bottom case 20, fitted with a cash-drawer 22, which is provided with a suitable lock, which is adapted to be actuated by the depression of the keys, as will be more fully described hereinafter. Within the case the main standard 23 is located, upon which the principal operative parts are mounted. This standard is constructed with a rearwardly-projecting keyboard or manual 23ª, which is fitted with three parallel series of plunger-spring keys of nine keys in each series, corresponding to the nine digits. The standard has two side pieces for the convenient attachment of the working parts, and beneath its bottom is a chamber in which the spring for throwing the drawer forward when it is released is confined. The works which project above the base are inclosed by a removable cover 21, which has an opening 21ª in its front for the exposure of the displayed indicators and another similar opening 21ᵇ on its back side for the exposure of the figures on the surface of the registering-wheels for convenience in reading the total registration. This cover can be confined in place by any of the well-known means used for similar purposes.

The invention consists in the combination of as many indicating-tablets (which for convenience are herein called "targets") as may be found necessary to indicate any probable single deposit, the functions of which are to indicate to the payer, on each occasion of payment and deposit, the exact amount of that particular transaction, a corresponding number of registering-wheels which are so connected with the devices which display the targets as to be simultaneously actuated thereby, upon the cylindrical-surface of each of which is inscribed a system of notation so arranged that by means of devices interposed between any two adjacent wheels the rotation of any wheel indicating an inferior denomination of money as many points or units as constitute a unit of the next higher denomination, the wheel indicating that next higher denomination will be advanced one point or unit. These wheels are so inscribed and operated that they always expose at a given reading-point the aggregate of the deposits or transactions had after they were set at zero.

Each wheel and target is under the control of a principal actuating-lever, which has a series of nine graded impact faces or steps in conjunction with nine operating-keys, one for each step, and which answer to the nine digits. The extent of elevation of the target and of the rotary movement of its coacting wheel is predetermined by either of two methods of constructing, arranging, and operating the keys and the stepped levers. One is by stepping the lever in a plane transverse to the axis of movement of the lever and on a line radiating therefrom, which gives a uniform key-movement in connection with a system of differentiated leverage, while in the other case a differential key-movement and a system of uniform leverage is secured by arranging the series of steps and keys transversely with the levers. Both systems are alike in employing similar keys to coact with a stepped lever, the difference lying in the transposition of the differential feature from the levers to the keys. Special novel devices are provided for supporting the elevated targets after registration, for releasing and dropping them preparatory to a new use, in special devices for checking and holding the registry wheels in their correct positions to agree with the indications on their respective targets.

Nearly all of the operative parts are shown in Fig. 1. In this view one of the side pieces of the frame is broken away, so as to bring into view the mechanism between the two side pieces. The register-wheels 38, 48, and 58, together with the targets 64, 74, and 84, are all pivoted on a spindle 34, which is bolted to one of the sides of the standard and is held therein by a nut, as seen in Fig. 2. Its other end is shouldered and threaded to fit a screw-bushing 101, which is fitted in a bearing therefor in the side piece of the standard. This bushing is provided for the purpose of regulating the tension of a coil-spring 102, which is interposed between it and the washer $w'$, which bears against the hub of the wheel 58. This provision is to hold the wheels when at rest. This is done by screwing it up or unscrewing it, as may be necessary. Washers $w$ $w$ $w$ are placed between the hubs of the several pieces on this spindle 34 of the shape seen in Fig. 10. Each one is provided with a lug $t$, which fits into a groove $34^a$ of the spindle. This lug prevents the washer from turning on the spindle whenever either the wheel or the target is rotated. This provision prevents the movement of one part from inducing a like movement in its otherwise adjacent part. Thus the movement of any one of the pieces pivoted on the spindle 34 will not affect any other piece.

Just back of the wheels the spindle 35 is located which carries the target-elevating levers 39, 49, and 59, and also the check-levers 42, 52, and 62. By means of a link and staple connection 66 67 the respective levers 39, 49, and 59 are connected with the target-arms 65, 75, and 85, while the pallets 40, 50, and 60, at the ends of said levers, serve to communicate motion to the respective registering-wheels. These registering-levers and check-levers are arranged in pairs side by side and each pair coacts with the same wheel, one to rotate it and the other to arrest its forward movement by checking the momentum imparted to it by the lever. Each pair of such levers is placed under the control of a range of operating-keys corresponding to the nine digits. These keys are disposed in three ranks or series, 103, 104, and 105, which answer cents, dimes, and dollars, respectively, in the case under consideration, and are placed in a line along and above the top edges of the registering and check levers, which lie beneath them and in close parallelism, so that the depression of any key will carry down under it both levers to the downmost limit of its throw. The upper edges of both these levers are stepped, as shown, so as to present a fair seat for receiving the impact of the end of the key; but this is not essential. A plain edge would answer, but perhaps not so effectively.

The stepping of the registering-levers is so arranged with reference to the bottoms of the keys as to be in contact with them when the machine is at rest. Hence the keys have a differential stroke, the key nearest the axle of oscillation 35 having the shortest and the one most distant therefrom the longest one; but the stepping of the arms of the check-levers 42, 52, and 62, which simply throw the detent 43 into engagement with the teeth of the wheels, which movement should be uniform for all the levers and for all the digits, is so regulated that when at rest such steps lie in planes at variable distances below the bottom ends of the keys, as seen in Fig. 1, and at such elevations that when any key is depressed only the latter portion of its stroke is effective on the levers, and is just sufficient to throw the detent into its position between the teeth of the wheel. Thus, when any key is depressed, it first engages the step of the register-lever and in pressing that down, by means of the pallet 40, rotates the wheel with which it engages until its further revolution is checked by the key striking the step of the check-lever, and by further depression throwing the detent into engagement with the teeth of the wheel, which engagement so effected sets the check-lever firmly and resisting all further depression of the key leaves the wheel set locked. Concurrently with this movement the upward stroke of the register-lever, by means of the connection 66, has pushed up the target 64 to an elevation, which exposes before the opening 21ª in the case one of the digits, of which a face view is seen in Fig. 2. Thus elevated the target is supported by the pawl 68, which engages the teeth of the ratchet 69. This pawl is weighted at its lower end to keep it in contact with the ratchet, as well as to check the momentum of the upward throw of the target. When the pressure is removed from the depressed key the spring $f$ throws it up and the preponderant weight of the pallet end of the register-lever and of the detent end of the check-lever cause them to drop, thus restoring them to their dormant positions. In this way all the targets may be raised so as to indicate dollars, dimes, and cents.

In this machine the register-wheels are graduated into one hundred spaces and every other space is indicated by a ratchet-tooth $s$. On the cent and dime wheels every tenth interval is marked by a special tooth or lug $u$, which is provided to aid in transferring registration from one wheel to the next. The faces of the registration-wheels are best seen in Fig. 2, in which the cent and dime wheels show the intervals marked by the digits repeated at each decimal interval. The dollar-wheel shows numbering consecutively from "1" to "100." By this combination of numbers the three wheels are capable of registering "$100.99." These transfer-lugs may, however, be arranged differently, so as to register as well for every hundredth multiple as for every tenth. The provisions for effecting transfer from one wheel to another are best seen in Figs. 7, 8, and 9. They consist of the double-pointed pallet 41, pivoted to the end of the check-lever 42, having the hook 41ª, which is adapted to engage the catch $p$ of the dog 95 under certain conditions. The point $i$ of this dog is fitted to lie in the path of the special teeth $u$ $u$ of the register-wheels, the dog itself being pivoted on the bar 96 and weighted so as always to keep the point $i$ in contact with the surface of the register-wheel.

The pallet 41 has its double-toothed end set over, as seen in Fig. 9, so that it will work with the teeth of the next adjacent wheel. It works as follows: As the pallet of the registering-lever propels the wheel with which it coacts along, the point $i$ of the dog 95 drags along on the surface of the wheel between the special teeth $u$ $u$, the weight of its dependent end holding it in this position, and by reason of such position the guard-catch $p$, being slightly lifted, keeps the hook 41ª fended off, so that the teeth at the end of the pallet 41 cannot engage the teeth of the wheel 48, with which it coacts. Thus the upward stroke of the check-lever to which this pallet is attached is fruitless so long as the point $i$ is kept in contact with the surface of the register-wheel; but the moment one of the special teeth $u$ $u$ strikes the point $i$ it forces it away or forward, which movement carries the guard-catch down, so that the weight at the lower end of the pallet 41 by dropping throws the point of the pallet against or in engagement with the teeth of the register-wheel and also throws the hook 41ª over the catch $p$. In this position the parts rest until the check-lever is depressed when, its short arm rising, pallet 41 moves the wheel 48 along one tooth. This movement is repeated as often as one of the special teeth $u$ $u$ passes over the point $i$ of the dog 95.

For the purpose of enabling the register-wheels to be made as cheaply as possible only half as many teeth are cast on it as there are numbers on the face of the wheel. In order to supplement this apparent lack of teeth the working end of the pallet 41 is constructed with two working points, the pitch of which is equal to half that of the wheel with which it works. Thus constructed the pallet and ratchet will register a single graduation, just the same as though there were a full complement of teeth and a single-pointed pallet, for in practice it is immaterial whether the wheel was left standing where the leading point of the pallet would fall in next behind the right tooth on the wheel to be acted on or in the interval just ahead of it, for if it falls in the space just ahead of the right tooth on the wheel the trailing point will engage the right tooth and the following movement of the check-lever will accomplish its proper work.

From the foregoing description it will be seen that after a deposit has been registered the targets will all be left standing, so as to display at the opening 21ª the amount of that sale. Before another registry can be made it is requisite that they be dropped, in order to bring their pallets into proper position to act on the wheels to make the new record correctly. For this purpose certain provisions connected with the opening and closing of the drawer are provided, which, together with the drawer-lock, will be described together.

The drawer 22 has a part of its central portion cut away at the back to avoid the main standard 23. This leaves a central compartment and two lateral compartments 131 and 132. To the front of the drawer is fitted a lock having a spring-catch 24, which can be operated either by the downstroke of the levers 39 42, &c., or by a key 29, Fig. 13. The details of the lock are seen in Fig. 13. They are inclosed in a suitable case 30 and consist of a bolt 26, which has two elongated slots $c'$, through which pass the pins 27 27 on which it slides. The upper and lower edges of this bolt are finished substantially of the shape shown, with the two opposed beveled slopes $a'$ $a'$ on the under side and $b'$ $b'$ on the upper side. Its under edge is fitted with the two notches 28 28 in which the bits of the key work. The bolt is designed to be used in three positions. It plays through mortises in the staples of the catch 24, as seen in Fig. 1. When the bolt is in the middle position, as in Fig. 13, the catch can play freely to the extent of the interval $d'$. So set it permits the keys to be depressed, so as to force the ends of the registering-levers against the top of the catch 24, and by forcing it down releases it from its keeper, so that the flat zigzag spring 36, which is interposed between the standard and the rear part of the central compartment partition 134, acts and throws the drawer forward, so that it can be further drawn out by the hand or removed altogether, if desired. In closing the drawer the beveled top of the catch in passing under the under edge of the cover is forced down against the spring 25, which throws the latch up after its top has passed its keeper, and thus leaves the case locked. By throwing the bolt to the right the beveled faces $a'\ a'$ draw the catch down, and as the end of the bolt is fitted to fill the mortise in the staples the catch is firmly secured in that position, so that it admits of motion in neither direction. On the contrary, if the bolt is shot to the left, the bevels $d'\ d'$ will throw the catch up if the spring 25 does not and will hold it there. These upper slopes, however, are not absolutely necessary where the spring is used in connection with the catch, for the latter could throw up the catch without the aid of the slopes.

In use the lock is set in the position as shown in the drawings, Fig. 13; but it sometimes happens that it is necessary to get into the drawer without operating the levers to depress the catch, for that operation makes a register to the extent of the number indicated by the target thrown up in the operation of opening. Hence other means are desirable to obtain access to the inside of the drawer without resorting to the keyboard for that purpose. In such a case the key is used and the bolt thrown to the right, by which means, as before described, the drawer is opened without disturbing the register. The extreme throw to the left is resorted to to exclude intrusion into the drawer and to prevent manipulation of the register-wheels unwarrantably.

The means for dropping the targets consists of the tripping-bail 100 and the tripping-slide 97, which work in conjunction with the pawls 68. The slide 97 is pivoted at its rear end on a screw or other center to some part of the interior of the drawer. It can play freely on this center, and its front end finds lodgment in the stud 98. It is fitted with a lifting-flange $z$, which is turned down at its front end, as shown, and has the under side of its back end beveled, as seen at $y$, in dotted line in Fig. 1. The bail 100 is hung on the center 96 and extends toward the front of the machine, as seen in Fig. 2. This bail has a lug $100^a$ projecting out from one side toward the slide 97, and at such an elevation that when the drawer is thrown forward the lug will pass over the slide, and as it passes the bevel $z$ will lift said slide and by so doing carry up the cross-bar of the bail against the under side of the pawls 68, 78, and 88, and by lifting them break their engagement with their respective ratchets 69, 79, and 89, thus releasing the targets, which immediately fall to zero. As the slide 97 passes out from under the lug $100^a$ of the bail the same drops down onto the stop-lug 99, where it rests. The position of the pawl and target are well shown in Fig. 6 as they appear at the moment of tripping, the target having fallen but the pawl not having resumed its dormant position.

The modification of the target-actuating mechanism shown in Fig. 5 operates very much as the one just described, but is constructed slightly different. Here the double-pointed detent and the pawl are one rigid piece, which is pivoted on the side of the check-lever at $c$. The tail-piece of the detent is concaved on its upper edge to correspond with the curve of the periphery of the register-wheel, as at $d$. When the lever in this case is depressed, the target having previously been raised, the detent and the concave $d$ are supposed to strike the periphery of the wheel at the same time, and as they are brought to a seat against it the point of the pawl enters the proper notch in the ratchet 69 preparatory to the drop of the detent $a$ out of engagement with the wheel. Its weighted extremity keeps it in engagement with the wheel until it is disengaged by the action of the tripping-bail, as before described.

The modification of keyboard shown in Figs. 14, 15, and 16 exemplifies the system of uniform leverage and a variable stroke of key, so far as the relations existing between either row of keys and the lever with which said row of keys works is concerned. This result is obtained by arranging the stepped member of the former combination at right angles with the lever to which it is attached and the keys above and in parallelism therewith. Taking the first lever 39 and its attachments as a type of the other two in the series, and its companion check-lever 42 as a like type of the others, with the rank of keys 103 above it, it will be seen that all the keys are made and mounted alike and have an equal stroke. Attached to a pad on the outer end of the lever 39 the stepped plate 117 is fastened. Each of these steps reading from right to left is at a regular progressively-increasing distance from the line of the bottom of the operating-keys. In juxtaposition with the register-levers are the check-levers, which are similarly constructed. Each one of them is provided with a transverse bar, designated $n$, $o$, and $p$, respectively, so adjusted that their top edges coincide with the lowest steps of their respective stepped register-bars. Thus when a key is pushed down it first strikes one of the steps of the register-lever and at the last stage of its descent strikes the top of the check-lever bar, the remainder of its stroke serving to check the wheel by setting the detent and the pawl which supports the target, and if the transfer-tooth is in the right position to effect the transfer of a count from one wheel to the next.

The operation of the machine is as follows: The wheels are set at zero, or so that the zero-mark shall be presented at the reading-orifice 21$^b$. Then the drawer is pushed in and latched by the latch 24, the bolt of the lock standing as in the drawings. Suppose, then, the first sale and deposit to be made is $4.75. The depression of the key-mark 4 in the dollar series, 7 in the dime series, and 5 in the cent series, will through the agencies before described bring into view at the aperture 21$^a$ the figures, as seen in Fig. 11. At the same time the several wheels will be correspondingly rotated, so as to bring into view at the aperture 21$^b$ the same combination of numbers, only they will be reversed in the order of reading. The drawer being thus opened the deposit is made and then it is closed. As it is being pushed in the tripping slide-bevel $y$ rides up on and over the lug 100$^a$, and as it turns freely on the pivot by which it is attached to the side of the drawer it rises and passes freely over that lug, and after it has passed its drops into its normal position, ready for the next operation. The next deposit we will assume to be forty cents. By pushing down the fourth key of the dime series the latch will be sprung, thus unfastening the drawer, and the spring 36 throws out the same, and as it moves forward the slide 97 catches the lug 100$^a$ of the tripping-bail, and lifting it, trips the pawls 68, 78, and 88, thereby releasing the target-ratchets and allowing the targets to fall to their idle position. This will happen as to all the targets except the one connected with the registering-lever, which is under the depressed key. As to this one the target will only fall to the point where the shoulder $k$ of the link 66 will rest on the eye or staple 67, and this will always be at the point to properly designate the new number to be registered.

I therefore claim as my invention—

1. The combination of the described ratchet wheel with the multi-toothed pallet, and means for actuating said pallet; the pitch of the teeth of the ratchet being a multiple of the pitch of the pallet teeth, substantially as described and for the purpose set forth.

2. The combination of the described ratchet wheel, with the multi-toothed pawl or detent, the pitch of the teeth of the ratchet being a multiple of the pitch of the teeth of the pawl, substantially as described and set forth.

3. The combination in a cash register of a series of register wheels each of which carries a series of lugs for actuating the transfer device of an adjacent check lever, and a series of sectoral indicators said wheels and indicators being arranged in pairs and both pivoted in a common axis, a series of operating levers and a series of check levers similarly arranged in pairs and both pivoted on a common fulcrum and adapted to oscillate in parallel planes, each of said check levers (save one) carrying a transfer device for advancing the next wheel, all constructed and arranged to operate substantially in the manner described and for the purposes set forth.

4. The combination in a cash register of a series of register wheels each of which carries a series of lugs for actuating the transfer device of an adjacent check lever, and a series of sectoral indicators, said wheels and indicators being arranged in pairs and both pivoted on a common axis, a series of operating levers and a series of check levers similarly arranged in pairs and both pivoted on a common fulcrum and adapted to oscillate in parallel planes, each of said check levers (save one) carrying a transfer device for advancing the next wheel, and a series of indicator supporting devices, constructed and arranged to operate substantially as specified.

5. The combination with the operating and check levers, of the cash drawer carrying a lock provided with the described spring catch having a contact face of sufficient breadth to span the whole series of levers, and also having provisions for locking said catch down or up against the under side of the operating levers, substantially as and for the purposes set forth.

6. The combination in a cash register of two register wheels one of which is provided with transfer lugs for throwing into action a transfer pallet or dog interposed between the wheels, with a check lever equipped with a transfer pallet adapted to act on the adjacent wheel and provisions connected with the transfer pallet and lying in the path of rotation of the transfer lugs for throwing said pallet into position to be worked by the elevation of the check lever, substantially as specified.

7. The combination in a cash registering mechanism of an actuating registry wheel equipped with a tripper actuating device;—a fulcrumed pawl tripper located in the path of said actuating device adapted when actuated by said device to throw a pallet connected with a key actuated lever (next mentioned), into engagement with another toothed registry wheel, and when uninfluenced by said lug to hold said pawl out of effective engagement with said last named wheel;—a lever placed under the control of the operating keys and carrying said pallet;—and a toothed registry wheel with which said pallet engages.

In testimony whereof I have hereto subscribed my name this 20th day of June, A. D. 1892.

EARL G. WATROUS.

In presence of—
FRANKLIN SCOTT,
C. E. CANFIELD.